Sept. 10, 1968  R. L. LICH  3,400,668
PNEUMATIC RAILWAY VEHICLE SUSPENSION
Filed Feb. 9, 1966
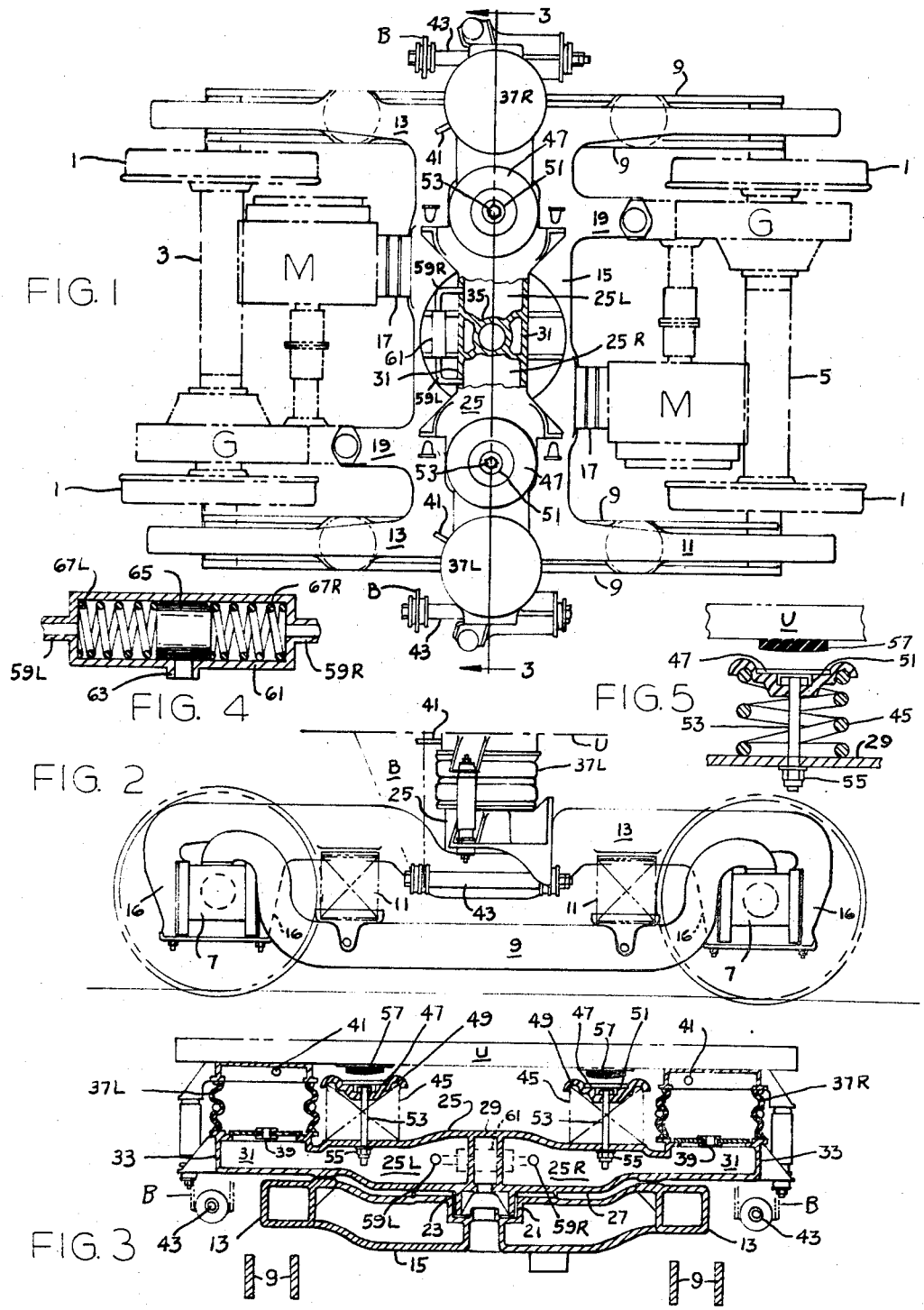
INVENTOR
RICHARD L. LICH
BY Bedell & Burgess
ATTORNEYS

United States Patent Office 3,400,668
Patented Sept. 10, 1968

3,400,668
PNEUMATIC RAILWAY VEHICLE SUSPENSION
Richard L. Lich, St. Louis, Mo., assignor to General Steel Industries, Inc., Granite City, Ill., a corporation of Delaware
Filed Feb. 9, 1966, Ser. No. 526,176
14 Claims. (Cl. 105—199)

ABSTRACT OF THE DISCLOSURE

A railway vehicle truck including load supporting flexible-wall pneumatic springs and metal coil safety springs arranged to carry the load in the event either of the pneumatic springs fails, e.g., by rupture of its flexible wall. To permit free deflection of the pneumatic springs throughout their normal operating range, vertical clearance at least as great as the normal operating deflection of the pneumatic springs is provided between the tops of the coil springs and the load by precompression of the coil springs and, to prevent a sudden jolt when the load drops onto the coil spring when an air spring fails, the precompression of the coil springs approximates the light weight of the spring-supported structure.

---

The invention relates to vehicle suspensions and consists particularly in a railway vehicle truck with flexible wall pneumatic springs and metal safety springs.

In conventional railway vehicle trucks equipped with pneumatic springs it has been the practice either to rely solely on the pneumatic springs for support because of their superior springing characteristics as compared with metal springs, or to utilize metal springs in parallel with pneumatic springs, so calibrated that the light load of the vehicle is carried by the metal springs, with loads in excess of the light load carried by the pneumatic springs. Other railway and highway applications of pneumatic springs have utilized free-standing coil safety springs arranged to support the load only in the event of pneumatic spring failure. Each of these arrangements has disadvantages. In the first, if the pneumatic springs fail, the vehicle load becomes substantially rigidly (i.e. nonresiliently) supported and derailment is likely with consequent discomfort and possible injury or death to the passengers and damage to the car body and equipment. In the second, some of the advantageous characteristics of all pneumatic suspension are lost. In the third, the transition from pneumatic support of the vehicle body to support on the safety springs is abrupt and jarring because the body must drop into engagement with the safety spring and then lower further in compressing the latter from its free to loaded height.

It is a principal object of the invention to provide means whereby a pneumatically sprung railway car can operate without danger of derailment, in the event of sudden failure of the pneumatic springs, and proceed to a maintenance facility without difficulty.

It is a more detailed object to provide, in a pneumatically sprung vehicle suspension, a safety spring of less height than the pneumatic spring so as to be inoperative during normal action of the latter, and precompressed to a compression substantially equal to the light weight of the vehicle body, so as to accept the vehicle body without substantial initial deflection in the event the pneumatic springs fail.

It is a further object to provide, in a pneumatically sprung vehicle equipped with safety springs or stops, means for deflating one of the pneumatic springs when gas pressure in the other pneumatic spring declines below a predetermined value due (for example) to rupture of its flexible wall.

The foregoing and additional more detailed objects and advantages will be evident from the following description and the accompanying drawings, in which:

FIG. 1 is a top view of a railway vehicle truck embodying the invention.

FIG. 2 is a side elevational view of the truck illustrated in FIG. 1.

FIG. 3 is a transverse vertical sectional view along line 3—3 of FIG. 1.

FIG. 4 is an enlarged vertical sectional view of the balancer valve shown in FIG. 1.

FIG. 5 is an enlarged transverse vertical sectional view of the safety spring.

The truck comprises flanged wheels 1 mounted on spaced axles 3 and 5, which rotatably mount journal boxes 7 at their ends. At the sides of the truck, pairs of drop equalizer beams 9 are supported at their ends on the journal boxes, and, intermediate their ends, support upright coil springs 11, 11 spaced apart longitudinally of the truck from each other. A truck frame comprising longitudinally extending side members 13, 13 rigidly connected to each other by a single transverse transom member 15 intermediate the axles. For positioning the axles relative to the frame, side members 13 are formed at their ends with pairs of depending pedestal legs, between which journal boxes 7 are vertically slidably received.

Traction motors M are supported from transom 15 by brackets 17, and associated axle mounted gear boxes G are connected to transom brackets 19.

At its center, transom member 15 is formed with an upwardly facing pivot and load supporting central bearing 21 which matingly receives a cooperating bearing 23 on the bottom of bolster 25.

The latter is of box section, preferably of cast metal and having a bottom wall 27, top wall 29, side walls 31 and end walls 33. A transverse partition structure 35, at the center of the bolster, divides the bolster into a pair of airtight compartments 25L and 25R to serve as surge chambers for flexible wall pneumatic springs 37L and 37R, respectively, which are seated on and sealingly secured to the end portions of bolster top wall 29, which are apertured as at 39 to provide free communication between bolster chambers 25L and 25R and pneumatic springs 37L and 37R respectively, air under pressure being introduced to the springs at the top through inlets 41 which are preferably connected, in conventional manner, by means of a height responsive valve (not shown) to a source of compressed air, to maintain the springs at substantially constant height irrespective of changes in load.

A car underframe U is seated on top of pneumatic springs 37L and 37R and is movable vertically and transversely of the truck with respect to the bolster through vertical and shear deflection of the springs. Relative movement of the bolster and underframe longitudinally of the truck is prevented, and acceleration and retardation forces are transmitted therebetween by longitudinally extending anchor links 43 at each side of the truck each connected at one end to an end of bolster 25 and at the other end to a bracket B depending from underframe U.

In order to provide spring support for the vehicle body in the event of failure of the pneumatic springs 37L and 37R during operation of the car, as for example, due to rupture of the flexible wall, I mount a pair of vertical coil springs 45, 45 on top wall 29 of bolster 25. Springs 45 are provided with circular caps 47 annularly grooved as at 49 to receive the topmost winding of the springs, and centrally apertured as at 51 to receive vertical bolts 53 which extend downwardly therethrough and through suitable holes in the bolster top wall 29. By means of nuts 55, bearing against the lower surface of bolster top wall 29, caps 47 are lowered until the compression of each spring 45 is equal to slightly less than its share of the light load of the car body.

Body underframe U is provided with rubber pads 57 in vertical alignment with spring caps 47, to provide additional cushioning when, in the event of pneumatic spring failure, the body drops onto the safety springs, the vertical clearance between pads 57 and spring caps 47 being substantially equal to (preferably slightly greater than) the maximum deflection of the pneumatic springs resulting from dynamic loads during normal operation, so as not to interfere with their operation under normal service conditions.

To avoid excessive lateral tilting of the body when a pneumatic spring on one side fails, means are provided for venting the other spring to atmosphere and thus deflating it when spring pressure on either side is less than a predetermined value. Preferably bolster air chambers 25L and 25R are connected, by conduit means 59L and 59R, respectively, to the opposite ends of a pressure differential responsive exhaust valve, comprising a cylinder 61 formed with downwardly open vent port 63, normally closed by floating piston 65, which is yieldably maintained in centered, or vent-closing, position by springs 67L and 67R, which are seated respectively against the left and right hand end walls of cylinder 61, springs 67L and 67R being so calibrated that when a pressure differential of a predetermined value, indicative of loss of pressure due to failure of one of the pneumatic springs, occurs, the excess pressure on the other side of piston 65 will move the piston toward the low pressure side, uncovering vent 63 on the high pressure side, thus permitting air to escape from the operative pneumatic spring, so that it will also be deflated and the operative pneumatic spring side of the car body will settle down on the corresponding safety spring, and thus not be supported in objectionable tilting fashion on the operative pneumatic spring on one side and on the coil safety spring on the other side.

Operation of the suspension is as follows: Under normal conditions, with both pneumatic springs 37L and 37R functioning properly, there is no contact between underframe pads 57 and coil safety spring caps 47, because of the vertical clearance between them, and consequently during normal operation, the body is supported solely on the pneumatic springs. In the event that one of the pneumatic springs, for example 37L, is ruptured and loses its air, the relatively high pressure in the other spring, 37R, communicated to cylinder 61 from chamber 25R through conduit 59R, will cause piston 65 to move to the left, uncovering vent port 63 and permitting the escape of air from undamaged spring 37R. Meanwhile the underframe would lower through the vertical clearance between pads 57 and safety spring caps 47 until pads 57 contacted caps 47, the contact being cushioned by pads 47, and the safety spring 45, precompressed to slightly less than light car load, would be compressed slightly more depending on the passenger load. The large initial compression which would occur with a free standing safety spring would thus be avoided.

The invention may be modified in various respects as will occur to those skilled in the art and the exclusive use of all modifications coming within the scope of the appended claims is contemplated.

What is claimed is:

1. A vehicle suspension comprising supporting structure, pneumatic springs mounted thereon and spaced apart transversely thereof, structure supported on said pneumatic springs at a predetermined height above said supporting structure, metallic springs mounted on one of said structures and spaced apart traversely thereof, said metallic springs having sufficient capacity to support said supported structure unaided by said pneumatic springs and being precompressed to a compression approximating the light weight of said supported structure and to a height substantially less than said predetermined height by an amount at least as great as the maximum normal operating deflection of said pneumatic springs whereby to provide vertical clearance between said metallic springs and the other of said structures during normal action of said pneumatic springs and being engageable with the other of said structures to form the sole support of said supported structure in the event of failure of a pneumatic spring, and means retaining said metallic springs in their precompressed condition.

2. A vehicle suspension according to claim 1 in which said metallic springs are coil springs.

3. A vehicle suspension according to claim 1 including elastomeric cushioning elements on the structure other than that mounting said metallic springs and in vertical alignment with said metallic springs.

4. A vehicle suspension according to claim 1 in which the precompression of said metallic springs is slightly less than the light weight of said supported structure.

5. A vehicle suspension according to claim 1 in which said metallic springs are positioned inwardly transversely of the vehicle from said pneumatic springs.

6. A vehicle suspension according to claim 1 in which said clearance is slightly greater than the maximum normal operating deflection of said pneumatic springs.

7. A vehicle suspension according to claim 1 in which the precompression of said metallic springs is slightly less than the light weight of the supported structure and said clearance is slightly greater than the maximum normal operating deflection of said pneumatic springs.

8. A vehicle suspension according to claim 1 including means responsive to loss of pressure in either of said pneumatic springs for deflating the other of said pneumatic springs.

9. A vehicle suspension according to claim 8 in which said pressure responsive means comprises a valve having an exhaust port, a normally centered closure member normally closing said port and being movable lengthwise in said valve to open said port, the opposite ends of said closure member communicating separately with said pneumatic springs.

10. A vehicle suspension according to claim 1 in which the vehicle is a railway car, the supporting structure comprising a truck and the spring-carried structure being the vehicle body.

11. A vehicle suspension according to claim 10 in which said truck comprises wheels, a frame supported thereon, and a transverse element supported on said frame for pivotal movements relative thereto about a vertical axis substantially at the center thereof, said pneumatic springs being carried by said transverse element.

12. A vehicle suspension according to claim 11 in which said metallic springs are coil springs.

13. A vehicle suspension according to claim 11 in which said transverse member is hollow and is divided into two compartments, each communicating with a separate one of said pneumatic springs, there being a connection between said chambers including means responsive to differences in gas pressure in said chambers beyond a predetermined value for venting the higher pressure chamber to atmosphere.

14. A vehicle suspension according to claim 11 in which said pneumatic springs are carried on the end portions of said transverse element and said metallic springs are positioned transversely inwardly therefrom.

References Cited

UNITED STATES PATENTS

| | | | |
|---|---|---|---|
| 779,858 | 1/1905 | Lillie | 105—197 |
| 811,622 | 2/1906 | Downer | 105—197 |
| 1,124,746 | 1/1915 | Kadel | 105—196 |
| 1,853,933 | 4/1932 | Schmidt | 105—197 XR |
| 3,092,042 | 6/1963 | Short et al. | 105—197 |
| 3,212,460 | 10/1965 | Peras | 105—199 XR |

ARTHUR L. LA POINT, *Primary Examiner.*

H. BELTRAN, *Assistant Examiner.*